3,179,700
PREPARATION OF 1,3-CYCLOHEXADIENE-1-
CARBOXALDEHYDES
Byron L. Williams, Jr., Texas City, Tex., assignor to Monsanto Company, a corporation of Delaware
No Drawing. Filed Feb. 14, 1962, Ser. No. 173,125
3 Claims. (Cl. 260—598)

The present invention relates to a novel method for the preparation of organic unsaturated compounds. More particularly, it relates to the preparation of 1,3-cyclohexadiene-1-carboxaldehydes.

Known methods for the preparation of 1,3-cyclohexadiene-1-carboxaldehydes involve multistep operations which are involved and tedious. It has now been discovered that these compounds can be prepared readily; efficiently and in a relatively pure state by a one-step process. According to the invention, 1,3-cyclohexadiene-1-carboxaldehydes are produced by reacting a trans 1-halobutadiene with an α,β-unsaturated aldehyde of the formula $$RR'C=CH-CHO$$

wherein R and R' are the same or different and represent hydrogen, a halogen, a hydrocarbon radical, or a hydrocarbon radical substituted by functional groups. The reactants are heated together under reflux conditions and the product is recovered from the reaction mixture by conventional fractionation techniques.

The invention is illustrated in the following examples, which, however, are not to be construed as limiting it in any manner whatsoever.

Example 1

About 300 g. of a crude 1-chlorobutadiene prepared by cracking 1,4-dichlorobutene and containing approximately 65% of the trans isomer (2 moles) was charged with 112 g. (2 moles) of acrolein to a three-necked, one-liter, round-bottomed flask equipped with a mechanical stirrer, a thermometer and a reflux condenser. The flask was heated to bring the contents to reflux and the reaction mixture was refluxed for a period of about 36 hours while the temperature was maintained between about 60 and 80° C. At the end of the reaction period when about 75% of the acrolein had been reacted, excess acrolein and 1-chlorobutadiene were evaporated from the reaction mixture on a rotating evaporator at room temperature for about 4 hours. The reaction mixture was then distilled under vacuum to yield a product fraction which upon redistillation gave 30 g. of 1,3-cyclohexadiene-1-carboxaldehyde identified by means of infrared spectrophotometric analysis.

Example 2

The experiment of Example 1 was repeated except that in this instance 106 g. of solid sodium carbonate was added to the reaction flask to function as an HCl acceptor. Reflux temperature was in the range from about 58° to about 74° C. Conversion of acrolein at the end of a 24-hour reaction period was about 67%. At the end of the 24-hour reaction period, the reaction mixture was distilled to yield about 50 g. of a straw-colored product identified by its infrared spectrum as 1,3-cyclohexadiene-1-carboxaldehyde having a purity of about 95% with the only major impurity being acrolein.

Example 3

The experiment of Example 2 was repeated using the same conditions and quantities of reactants. The reaction mixture was refluxed for a period of about 30 hours at temperatures from about 58° C. to about 75° C. The reaction mixture was distilled over a small amount of sodium carbonate (3 g.) in a column packed with ⅛ in. helices to obtain 85 g. of 1,3-cyclohexadiene-1-carboxaldehyde having a purity of about 95%.

The invention is not to be considered as limited to the specific reactants and conditions set forth in the examples. For instance, while the process of the invention has been described using trans 1-chlorobutadiene, the trans isomer of other halobutadienes, e.g., 1-bromobutadiene and 1-iodobutadiene, can be employed as well. Likewise, instead of acrolein, the trans 1-halobutadiene can be reacted with any α,β-unsaturated aldehyde of the formula $$RR'C=CH-CHO$$

wherein R and R' are the same or different and represent hydrogen, a halogen, a hydrocarbon radical, or a hydrocarbon radical substituted by functional groups. Examples of suitable hydrocarbon and substituted hydrocarbon radicals which R and R' can represent in the above formula are methyl, ethyl, isopropyl, hexyl, cyclohexyl, phenyl, tolyl, cumyl, naphthyl, xylyl, furfuryl, thienyl, chloromethyl, cyanoethyl, hydroxyphenyl, and the like. Examples of useful aldehydes in the reaction include β-chloroacrolein crotonaldehyde, β,β-dimethylacrolein, β-isopropyl crotonaldehyde, cinnamaldehyde, β,β-methyl phenyl acrolein, β-benzyl crotonaldehyde, β-cyanoacrolein, and the like.

The reaction temperature is not critical. The reactants are usually heated together at a temperature between about 50° and about 100° C. Generally, the reaction is begun at the atmospheric reflux temperature of the mixture. As the reaction proceeds, the temperature gradually increases as the product builds up and the boiling point of the mixture increases. Higher temperatures can be used and the reaction can be conducted at pressures above atmospheric but there appear to be no advantages in the use of such conditions.

Conversion depends upon length of reflux and reaction time is, therefore, optional.

The stoichiometric ratio of reactants, i.e., one mole of the trans 1-halobutadiene per mole of aldehyde is the preferred one. Either reactant can be employed in excess to increase the rate of reaction. There is no practical advantage in this mode of operation, however, because it necessitates recovery of unreacted materials from the reaction mixture.

While an acceptor for HCl is not required in the reaction, more efficient operation is obtained when one is employed. Any weak insoluble base which is not sufficiently basic to destroy the aldehyde can be employed to take up the HCl given off in the reaction. In addition to the sodium carbonate exemplified, potassium carbonate, sodium bicarbonate, potassium bicarbonate, calcium carbonate, barium carbonate, and the like are suitable for use as HCl acceptors in the reaction.

Recovery of the 1,3-cyclohexadiene-1-carboxaldehyde is effected readily by conventional distillation techniques. Compounds useful as HCl acceptors in the reaction may also be advantageously employed in the distillation recovery step since they function as inhibitors of polymerization of the unsaturated aldehyde product and thus prevent or reduce any loss in yields which might arise from polymerization.

What is claimed is:

1. The process of producing 1,3-cyclohexadiene-1-carboxaldehyde which comprises heating trans 1-chlorobutadiene with acrolein under reflux conditions and recovering 1,3-cyclohexadiene-1-carboxaldehyde from the reaction mixture.

2. The process of producing 1,3-cyclohexadiene-1-carboxaldehyde which comprises heating trans 1-chlorobutadiene with acrolein under reflux conditions in the presence of an HCl acceptor chosen from the group consisting of sodium carbonate, potassium carbonate, calcium carbonate, and barium carbonate and recovering 1,3-cyclohexadiene-1-carboxaldehyde.

3. The process of claim 2 wherein said HCl acceptor is sodium carbonate.

References Cited by the Examiner
FOREIGN PATENTS 526,168    6/31    Germany.

OTHER REFERENCES

Onishchenko et al.: Chemical Abstracts, vol. 54 (1960), page 20916.

LEON ZITVER, *Primary Examiner.*